(12) United States Patent
McEvoy (10) Patent No.: US 7,503,577 B2
(45) Date of Patent: Mar. 17, 2009

(54) BACKABLE TOW BAR ADAPTER, AND METHOD

(76) Inventor: Michael J McEvoy, PMB 7917, P.O. Box 2428, Pensacola, FL (US) 32513

( * ) Notice: Subject to any disclaimer, the term of this patent is extended or adjusted under 35 U.S.C. 154(b) by 353 days.

(21) Appl. No.: 11/343,008

(22) Filed: Jan. 30, 2006

(65) Prior Publication Data
US 2006/0177293 A1 Aug. 10, 2006

Related U.S. Application Data

(60) Provisional application No. 60/650,319, filed on Feb. 4, 2005.

(51) Int. Cl.
*B60D 1/155* (2006.01)
(52) U.S. Cl. .................. 280/493; 280/484; 280/495; 280/402; 280/401; 414/428; 414/563; 414/426
(58) Field of Classification Search .......... 280/493, 280/484, 495, 402, 401
See application file for complete search history.

(56) References Cited

U.S. PATENT DOCUMENTS

| | | | | |
|---|---|---|---|---|
| 3,984,120 | A | * | 10/1976 | Boveia .................. 280/402 |
| 4,113,272 | A | | 9/1978 | Sebby |
| 4,186,938 | A | * | 2/1980 | Youngblood ............ 280/402 |
| 4,194,755 | A | | 3/1980 | Youngblood |
| 4,384,817 | A | * | 5/1983 | Peterson ................. 414/563 |
| 5,269,553 | A | * | 12/1993 | Alonso .................. 280/402 |
| 5,429,382 | A | | 7/1995 | Duncan |
| 5,755,454 | A | | 5/1998 | Peterson |
| 5,775,714 | A | | 7/1998 | Meadows |
| 5,782,596 | A | * | 7/1998 | Young et al. ............ 414/563 |
| 5,915,715 | A | | 6/1999 | Ford |
| 5,984,616 | A | * | 11/1999 | Youmans et al. ........ 414/563 |
| 6,315,515 | B1 | * | 11/2001 | Young et al. ............ 414/563 |
| 6,796,572 | B1 | | 9/2004 | McGhie |

OTHER PUBLICATIONS

Web-based advertisement of a power jack, posted at www.adth.com as of Jan. 11, 2005 (one page photo).
Selected pages from Blue Ox Catalog (pp. 513-516. 525-526, dated Jan. 2005).
Web based advertisements depicting baseplate products of the Blue Ox Company (3 pages) posted at www.aemfg.com as of Jan. 11, 2005 and at www.towbar-finder.com as of Jan. 11, 2005.
Web-based advertisement of Roadmaster Tow Bar Mounting Bracket, posted at www.campingworld.com as of Jun. 11, 2005 (1 page only).

(Continued)

*Primary Examiner*—Paul N Dickson
*Assistant Examiner*—Marlon A Arce
(74) *Attorney, Agent, or Firm*—David E Herron, II (57) ABSTRACT

The invention is a tow bar adapter which is attached to the existing fittings of the commonly used tow bar used to tow a vehicle behind a motor coach and selectively elevate the front end of the towed vehicle. The invention is a also a method for providing a tow bar adapter attached to the existing fittings of a standard tow bar used to tow a vehicle behind a motor coach and selectively elevate the front end of the towed vehicle.

19 Claims, 8 Drawing Sheets

OTHER PUBLICATIONS

Advertising brochure depicting Roadmaster Tow Bar (5 pages) dated Mar. 2003.

Web-Based advertisement of Power Plus Company depicting various jacks (3 pages), posted at www.powerpluslevelers.com as of Jan. 26, 2005.

Web-Based advertisement of Paktron Products Company depicting wheels for tow bars, posted at www.pakindustries.com as of Oct. 2, 2004 (2 pages).

* cited by examiner

BACKABLE TOW BAR ADAPTER, AND METHOD

FIELD OF THE INVENTION

The invention pertains to the towing of vehicles, and is designed to permit backing of a motor coach that is towing a four-wheeled steerable vehicle.

BACKGROUND OF INVENTION

Cars and light trucks are commonly towed behind motor homes for the purpose of providing local transportation after the motor home is attached to the campground facilities. Commonly used tow bars restrict a driver's ability to back the motor home and car combination while the tow bar is fitted to the towed vehicle. If backing is attempted, the front wheels often twist or turn, thereby preventing straight backing.

There are newer tow bars available which allow backing, but are limited to certain tow vehicles with specific front wheel caster angles. The present invention is not so limited. Instead, the invention, when used properly, reduces problems associated with jackknifing or cramping of steer wheels of varied towed vehicles.

SUMMARY OF THE INVENTION

The Inventive Adapter

The invention is an adapter configured to assist a driver in backing a motor home having a towed vehicle behind it. The invention is also a method for accomplishing the same.

The inventive adapter is configured to fit to standard attachments used in the towing of a vehicle behind a motor home. Generally, the standard attachment is a common three-point towbar with horn-like tabs. The tabs protrude from a front face of the vehicle. Further, the motor coach has, at its rear, standard fittings that receive a three-point towbar. Specifically, the adapter will include a bracket including a plate with receptacles attached to the bracket. Each receptacle is configured to receive a respective horn-like tab that protrude from the front face of the vehicle.

The adapter will also have a means for securing the adapter in a locked position, wherein the respective tabs are secured within the receptacles. The adapter will also include an elevator configured to selectively position the adapter, thereby raising a front end of the towed vehicle, enabling a driver to more easily back the tandem of the coach and towed vehicle.

In a preferred embodiment, the elevator is a jack, such as a scissors jack, screw-type jack, an electric scissors jack, an electric jack, or the like. The plate may have an aperture allowing the post to pass through. In this embodiment, collars couple the post (which usually bears a telescoping configuration) to the plate.

In order to increase sturdiness and stability, a web support may extend generally upward and orthogonal from the plate. This web support may terminate in an upper plate having a bore positioned above the aperture. In this embodiment of the adapter, the elevator is a jack having a post that passes through the bore and the aperture.

The adapter will likely include a switch configured to selectively activate the elevator. Preferably, the switch that selectively activates the elevator is located distal the adapter, preferably within the motor home.

A wheel, roller or skid is positioned at the bottom end of the post. When the motor coach is driven forward, the adapter is kept in a position elevated from the ground. When the driver desires to back the motor coach, however, the elevator is activated to further raise the front end of the towed vehicle, preferably off the ground. Alternatively, the elevator may raise the front end of the vehicle so that the front wheels lightly touch the ground with minimal weight, which of course reduces the friction and resistance between the wheels and the ground. In this raised position, the towed vehicle behaves much like a two-wheeled trailer, thereby eliminating the problems encountered with towing a four-wheeled vehicle behind a backing motor home.

A wheel, skid, or other ground engaging means is at the terminal end of the lower post. It is important that the adapter be constructed of material that is strong, sturdy, and weather resistant. Cast iron and other rust-proofed metals having substantial strength are preferred.

The Inventive Method

As stated above, the invention also includes a method. The inventive method is for backing up a motor coach having a towed vehicle attached thereto. The towed vehicle is attached to the motor home by means of a common three-point towbar, and the vehicle has standard horn-like tabs protruding from its front face or may have internal receivers to which a horn-like tab is attached. More particularly, the method will include the steps of providing an adapter as described herein, and securing the adapter in a locked position, such that the respective tabs are positioned within the respective receptacles. The inventive method will also include the step of positioning the adapter between the vehicle and the motor coach, and coupling the adapter to each of the vehicle and the motor coach.

The method will also require the attaching of an elevator to the adapter. This elevator should be configured to selectively position the adapter between a first position, wherein the front wheels of the towed vehicle touch the ground, and a second position wherein the front of the towed vehicle is elevated, preferably disengaging the front wheels from the ground. When the front wheels are off the ground, the driver can back the motor coach with greater ease.

Optionally, the elevator may be a jack, such as an electric scissors jack, an electric screw-type jack, a power jack, or the like. In an alternate embodiment of the method, the plate bears an aperture, and the jack has a post that passes through the aperture. Generally, it is preferred to have a single elevator, but multiple elevators are within the scope and spirit of the invention. Stability of the adapter may be increased by adding a web support that extends generally upward from the plate. In this embodiment of the method, these web supports may terminate in an upper plate having bore positioned above the aperture. Consequently, the elevator is a jack having a post that passes through each of the bore and the aperture.

The method may also include the step of configuring a switch to selectively position the adapter in either the raised or lowered position. The switch may be positioned in a remote location distal the adapter, such as within the motor home. The elevator may be battery powered, such as powered by the battery of the towed vehicle, or even powered by a battery within the motor home. In that regard, the method will include the step of electrically connecting the elevator to the battery. Other objects, advantages and novel features of the present invention will become apparent from the following detailed

DETAILED DESCRIPTION OF THE PREFERRED EMBODIMENTS

Figure 1:
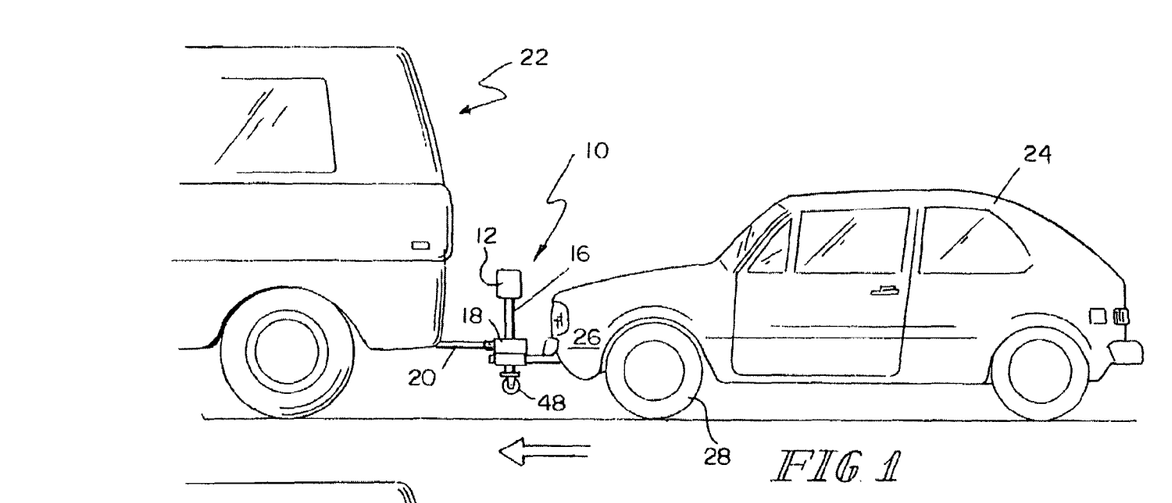
FIG. 1 is a side view showing the inventive adapter and method, shown with the adapter in a raised position and the vehicles traveling forward.

FIG. 1 depicts he inventive adapter 10 and method, shown with the adapter 10 in a raised position and the vehicles 22, 24 traveling forward. When traveling forward, the adapter 10 is in a raised position so that it does not engage the ground. The adapter 10 comprises a bracket 18 positioned between an upper post 16 and a lower post 14 having a wheel 48 coupled to its bottom end.

As shown in FIG. 1, the adapter 10 is coupled to the front end 16 of the towed vehicle 24, and also connects to a tow bar 20 connected to the coach 22. Preferably, the wheel 48 is sufficiently elevated to provide ground clearance and prevent unwanted contact with the ground when the vehicles 22, 24 are traveling forward.

Figure 2:
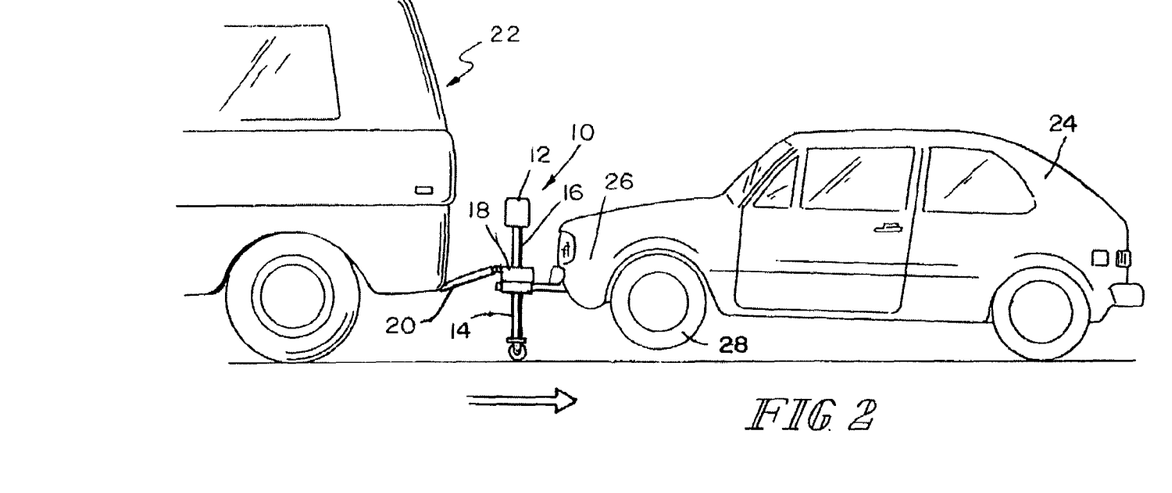
FIG. 2 is a comparative side view of the inventive adapter and method, shown with the adapter in a ground-engaging position and the vehicles traveling backward.

FIG. 2 shows a comparative side view of the adapter 10 when activated to raise the front end 26 of the vehicle 24 from the ground. By activating an elevator control 12, the lower post 14 telescopes downwardly so that the wheel 48 engages the ground. Further, the lower post 14 should continue to telescope downwardly in order to elevate the front end 26 from the ground, thereby easing the difficult task of traveling backward.

Still referring to FIG. 2, it is of note that the front wheel 28 is shown to be lifted off the ground. Through experimentation and use, it has been determined that the front wheel 28 need not completely disengage the ground. Rather, raising the front end 26 of the vehicle 24 so that the front wheel 28 remains in light contact with the ground will produce positive results as well, because the frictional resistance caused by the weight of the front end acting on the ground through the front wheels is greatly reduced.

Figure 3:
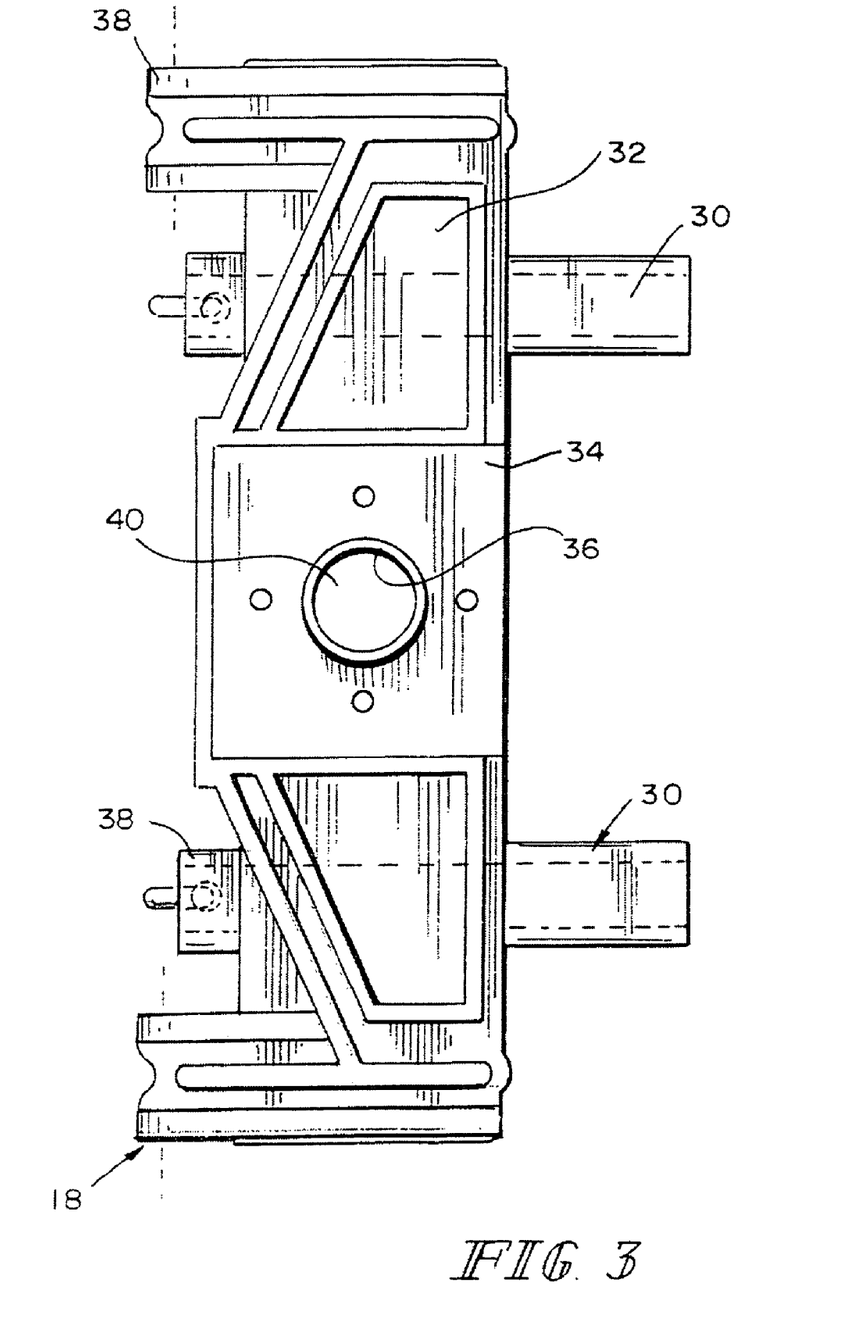
FIG. 3 is a plan view of the top portion of the bracket portion of the adapter, according to the principles of the invention.

FIG. 3 is a plan view of the bracket 18 of the adapter 10, according to the principles of the invention. The bracket includes a sturdy plate 32 having an aperture 40 configured to accommodate the lower post 14 (not shown in FIG. 3 but viewable in FIG. 1). A pair of receptacles 30 extend from the bracket 18 and are configured to receive horn-like posts that protrude from the front end of a towed vehicle.

Still referring to FIG. 3, the bracket 18 will also include an upper plate 36 having a bore 36 formed to receive the upper post 16 (not shown in FIG. 3 but viewable in FIG. 1). The upper plate 36 is connected to the lower plate 32 by supporting webs 33 that extend upwardly from the lower plate 32. A pair of couplers 38 extended outwardly from the bracket 18 and are configured to engage a tow bar 20 that couples the vehicles 22, 24 together.

Figure 4:
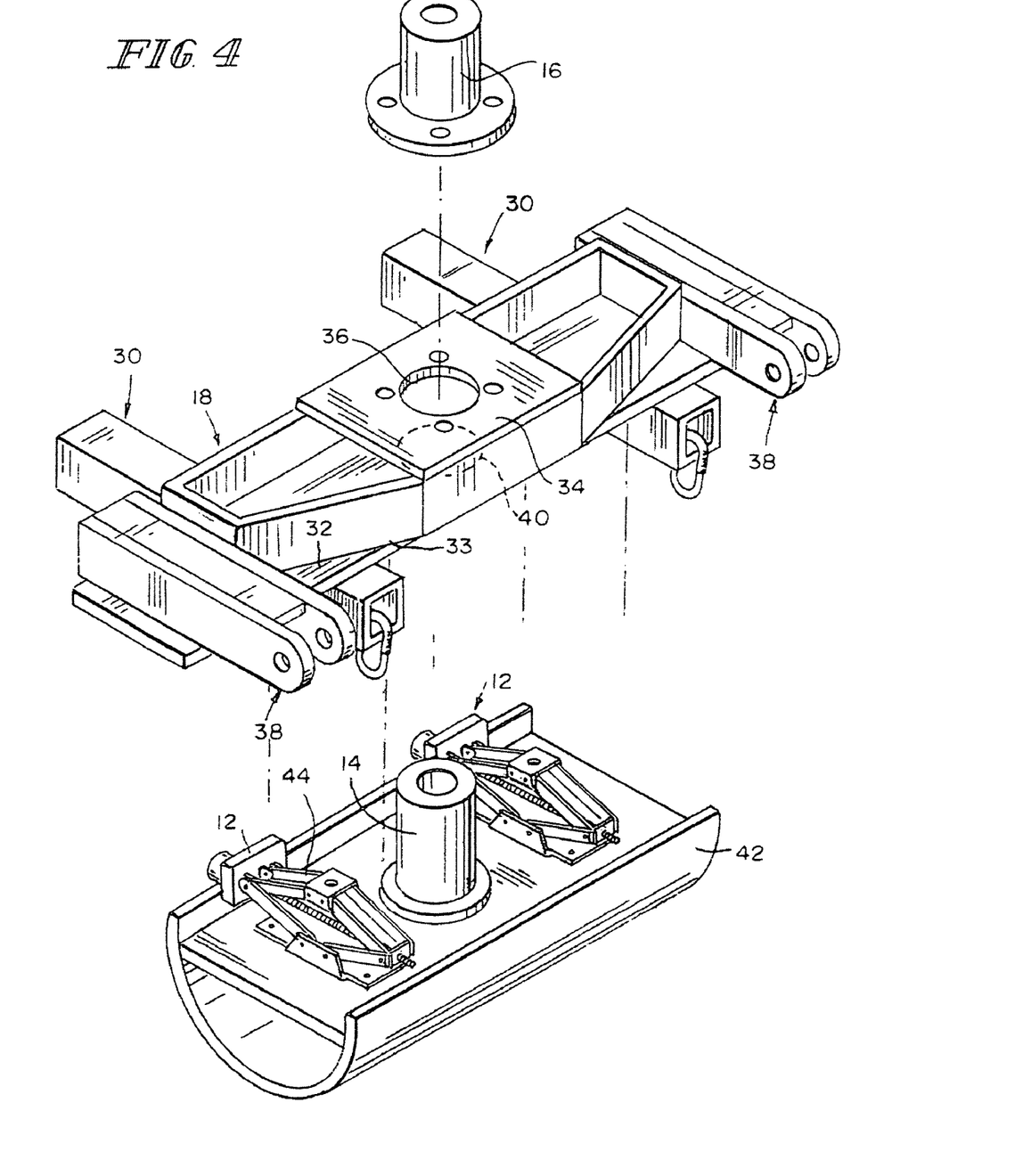
FIG. 4 is a perspective view showing a first preferred embodiment of the adapter and its bracket, according to the principles of the invention

FIG. 4 is a perspective and exploded view showing the bracket 18 in combination with a skid 42 that is coupled to the bottom end of the lower post 14. One should note that the configuration of the bracket 18 is similar for either the first (shown in FIG. 4) or second (shown aft) embodiments of the adapter 10, so the analogous and similar parts of the bracket 18 are not repeated with regard to the description set forth regarding FIG. 4.

The embodiment shown in FIG. 4 shows a skid 42 coupled to the bottom end of the lower post 14. The lower post 14 is coupled directly to a slab 46, and the skid 42 is firmly coupled to the slab 46. A pair of scissors jacks 44 are positioned on opposing sides of the lower post 14, and connect the slab 46 to the lower plate 32 of the bracket 18.

The embodiment shown in FIG. 4 is preferred when backing on rough or uneven or unpaved surfaces, such as gravel, dirt, or grass. The skid 42 is generally formed of a durable and sturdy material (such as a polyester or hard plastic) that is slightly pliable and provides some damping of the vibrational impact caused by engaging the ground while the vehicles 22, 24 are moving.

Still referring to FIG. 4, other ground-engaging means fall within the scope of the invention; for example, a plurality of wheels or rollers may be positioned on the underside of the slab 46, giving the adapter 18 sturdy support.

Figure 5:
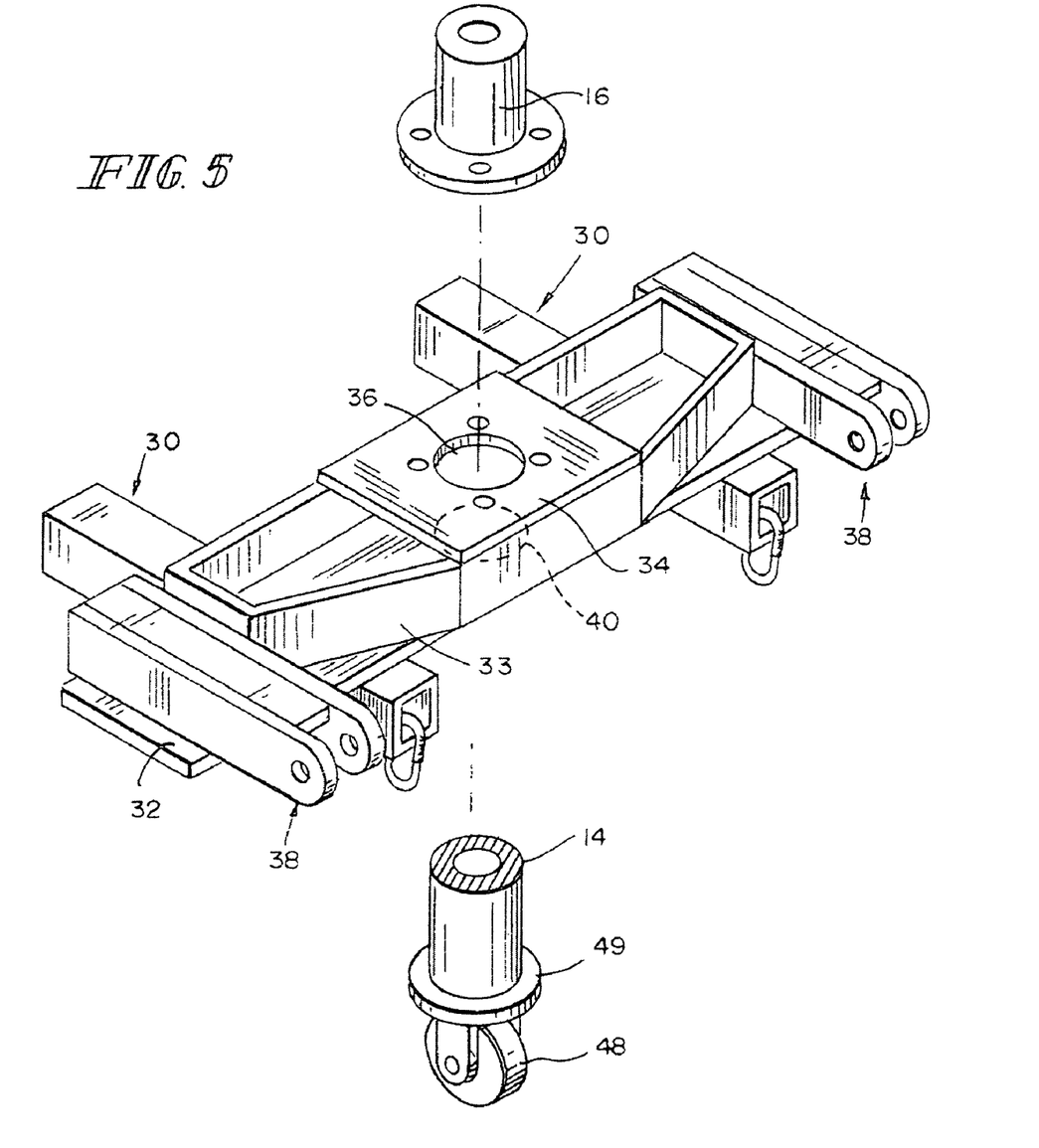
FIG. 5 is a perspective view showing a second preferred embodiment of the adapter and its bracket, according to the principles of the invention.

FIG. 5 depicts a second preferred embodiment of the adapter and its bracket, according to the principles of the invention. Because many of the parts of the second embodiment of the adapter 18 are analogous to the first embodiment shown in FIG. 4, a detailed discussion of these analogous parts would be unnecessary and repetitive. Note, however, that the second embodiment differs from the embodiment shown in FIG. 4 in that the ground-engaging portion of the bracket 18 differs significantly. The lower portion of the post 14 (preferably telescoping, perhaps into upper post 14), terminates with a wheel 48 (such as a caster wheel or roller) coupled to its bottom end.

If one opts to use the embodiment shown in FIG. 5, it is important that the wheel 48 be sufficiently sturdy to accommodate the weight of the towed vehicle, the frictional force created by engagement with the ground, and any impacting forces created by movement along an unsteady surface. In order to increase stability, a plurality of wheels or rollers may be positioned at the bottom of the lower post 14. In order to minimize impact, the adapter 18 may include a damper 49. As shown in FIG. 5, the damper 49 is a sturdy yet pliable collar between the wheel 48 and the bottom of the post 14.

Figure 6:
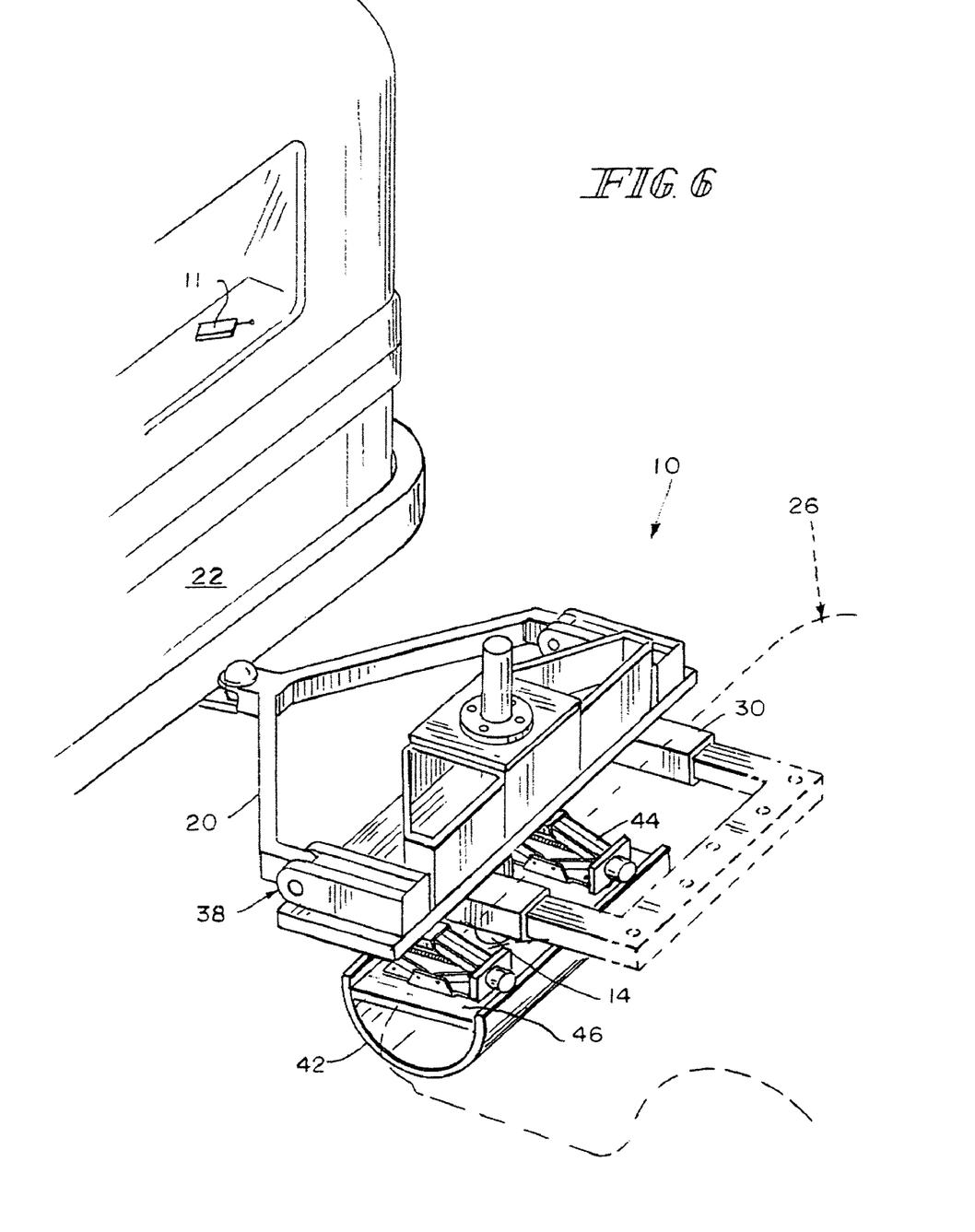
FIG. 6 is a perspective view of the first embodiment of the adapter coupling the rear of a motor home to the front of a towed vehicle, according to the principles of the invention.

FIG. 6 shows the adapter 10 connecting the front end 26 of a towed vehicle 24 to the rear of a motor coach 22. A tow bar 20 extends from the rear of the motor coach and connects to couplers 38 that extend from the bracket 18. A pair of receptacles 30 extend from the bracket 18 to lockingly engage horn-like tabs that protrude from the front end 24 of the vehicle, such as through its grille.

Still referring to FIG. 6, the lower post 14 extends downwardly from the bracket 18 and terminates by coupling with slab 46. A skid 46, preferably of a durable yet pliable material, attaches to the slab and forms a smooth ground-engaging surface.

As shown in FIG. 6, a scissors jack 44 engages the slab 46 at one of its ends, and the bottom of the bracket 18 at its other end. As shown above, it is preferred to use a pair of scissors jacks 44, each of the pair being positioned at an opposing side of the lower post 14.

As shown in FIG. 6, the adapter 10 will include an elevator control 12 including a switch 13 that can selectively activate the elevating means (such as scissors jack 44), causing the lower post 14 to telescopically expand downwardly so that the skid 42 engages the ground, thereby imparting a lifting force to the front end 26 of the towed vehicle.

As the front end 26 of the towed vehicle 24 is elevated, the tow bar 20 will accordingly raise as well, thereby imparting a counter-clockwise rotation (given the orientation shown in FIG. 6) of the end distal the coach 22 with regard to the end attached to the hitch of the coach. While many standard tow bars are configured to allow some relative rotation, it is important to cooperatively configure the tow bar 20 with the couplers 38 in order to accommodate some relative rotation yet meanwhile provide a secure connection.

The embodiment shown in FIG. 6 features an elevator control 12 enabling selective activation of the elevating means (such as scissors jack 44). Alternatively, the elevator control 12 may be selectively activated by a remote control device 11 enabling activation of the elevator control from a remote location, such as from within the motor coach 22. The elevator control 12 may be powered by an internal battery pack (not shown) or connected via cables 50 to the battery of the towed vehicle 24.

Figure 7:
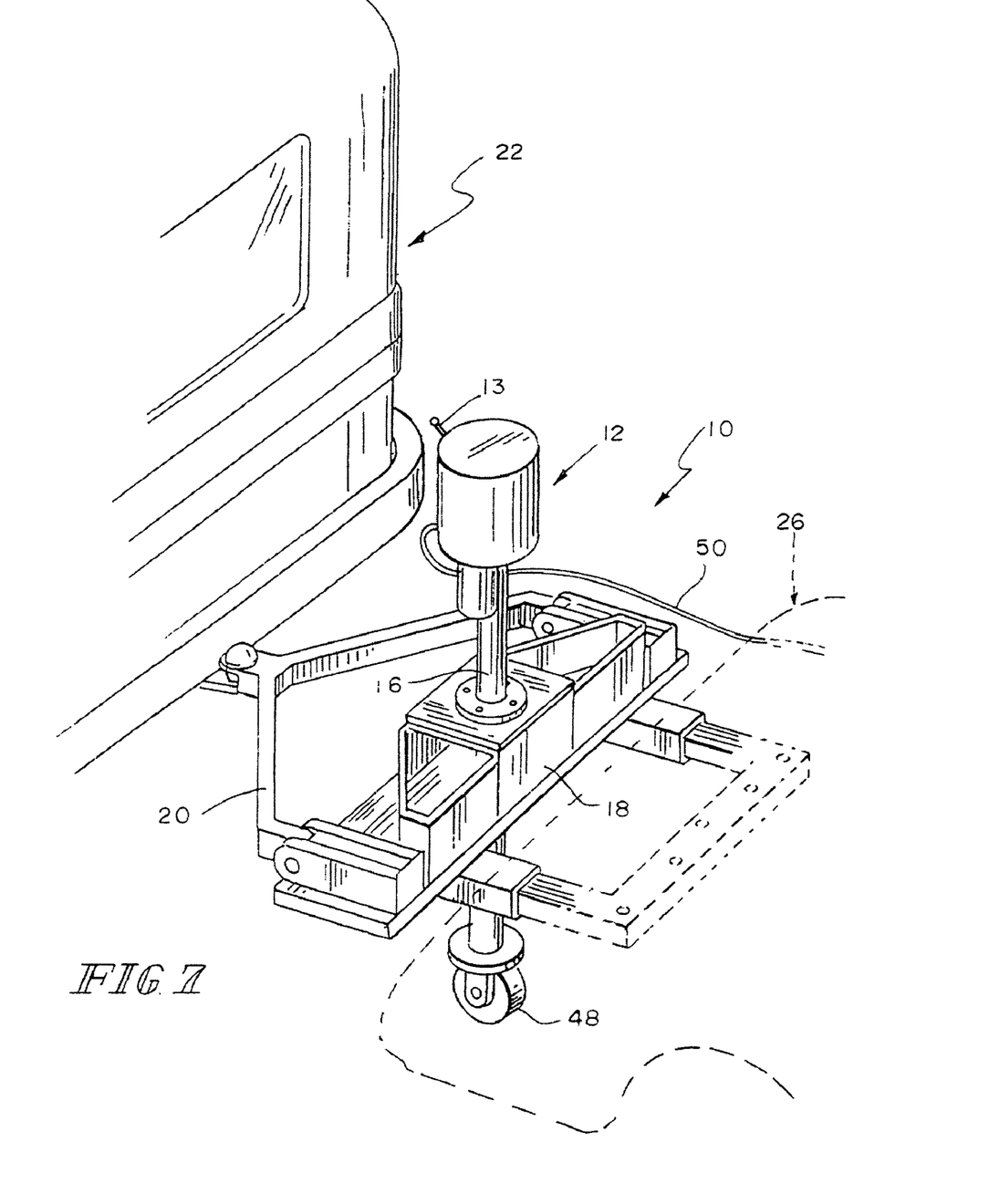
FIG. 7 is a perspective view of the second embodiment of the adapter coupling the rear of a motor home to the front of a towed vehicle, according to the principles of the invention.

FIG. 7 shows the a second embodiment of the adapter 10 connecting the front end 26 of a towed vehicle 24 to the rear of a motor coach 22. The parts of the embodiment of the adapter 10 shown in FIG. 7 are in many ways, similar and analogous to the parts shown in FIG. 6, except that the ground engaging skid is replaced by a wheel 48 positioned at a bottom end of the lower post 14. FIG. 7 shows a single wheel 48 positioned at the bottom of the lower post 14; however, additional wheels may be added to increase stability and durability.

Experimentation and use have shown that the embodiment shown in FIG. 7 is well-suited for paved or smooth surfaces; rough and unpaved surfaces may cause a single wheel 48 to jam, so it is important to select a wheel (or plurality of wheels) capable of supporting dynamic loads.

Figure 8:
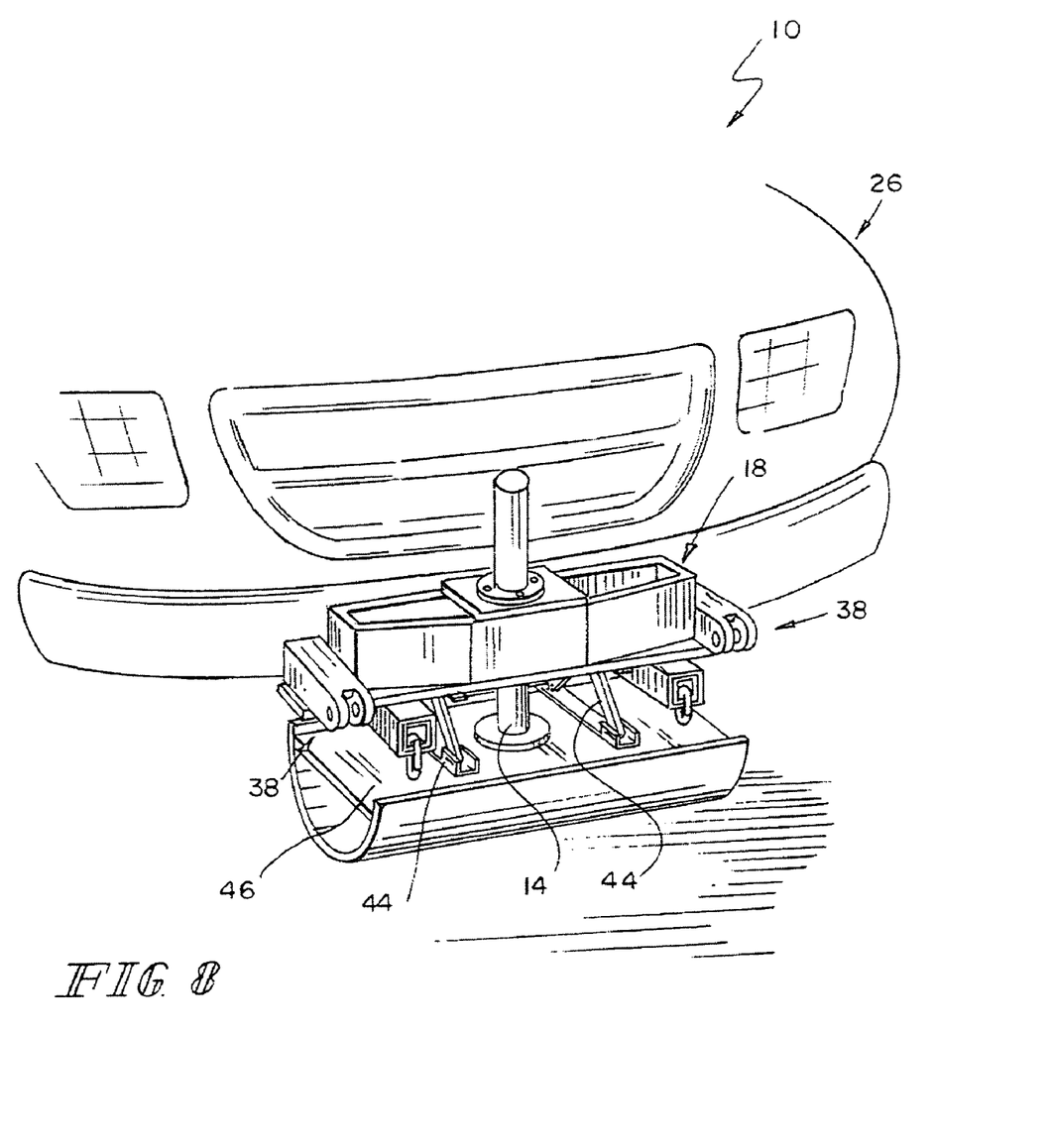
FIG. 8 is an isolated, perspective view showing the first embodiment of the adapter coupled to the front end of a towed vehicle.

FIG. 8 is an isolated, perspective view showing the first embodiment of the apter coupled to the front end of a towed vehicle. As with previous views, the parts of the adapter 10 shown in FIG. 8 are analogous and similar to views hereinabove. The telescoping lower post 14 attaches to slab 46, which is connected to a pliable yet sturdy skid 42. A pair of scissors jacks 44 are on opposing sides of the lower post 14 so that the bottom of each is affixed to the slab 46 and the top is affixed to the bracket 18. The scissors jacks 44 may be selectively activated by means of the elevator control 12.

Still referring to FIG. 8, the scissors jacks (or other elevating means) 44 are selectively activated by the elevator control 12, which may bear a switch enabling are selective activation of the elevator control 12. The elevator control 12 is empowered electronically, either by a self contained battery pack or using cables 50 to connect the elevator control 12 to the battery of the towed vehicle 24.

As shown in FIG. 8, a pair of couplers 38 extend from the bracket 18 and are configured to grip cooperatively configured receptacles of a tow bar 20 (not shown in FIG. 8; viewable in FIGS. 1, 2)

Figure 9:
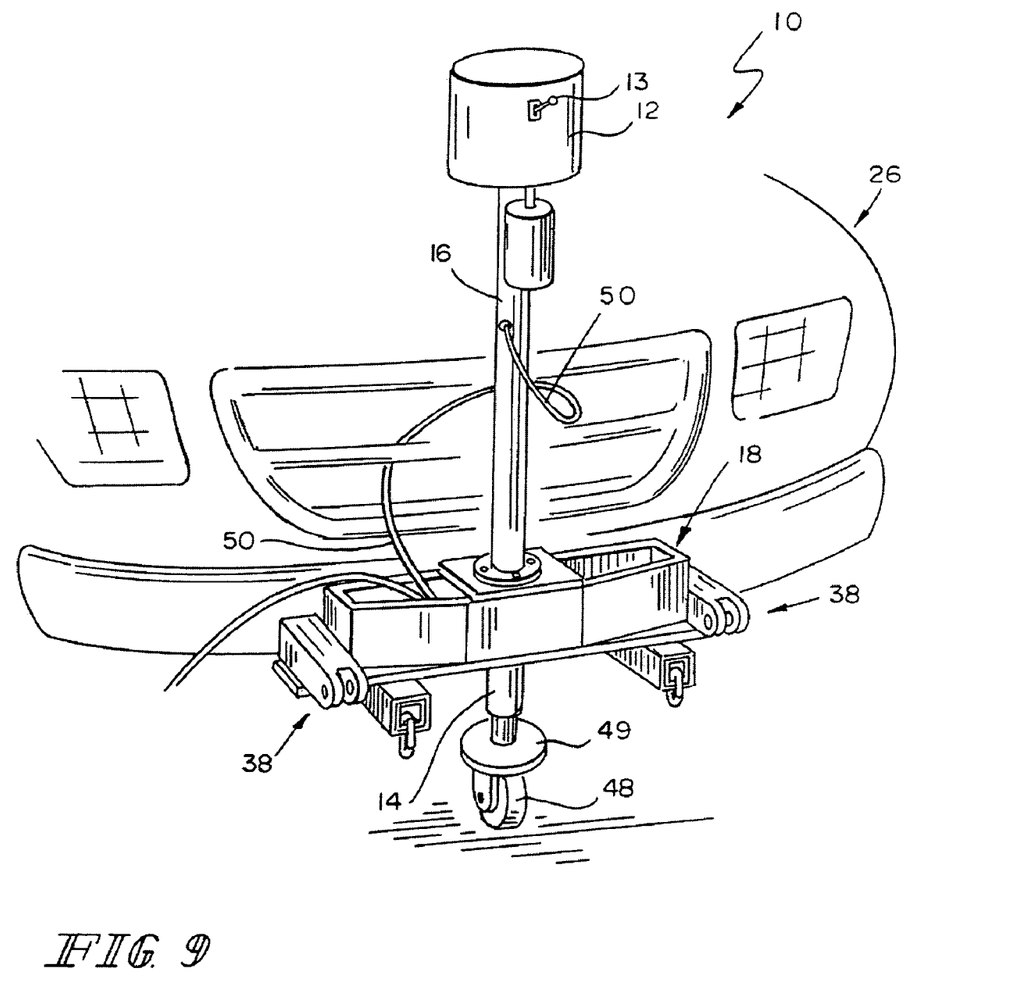
FIG. 9 is an isolated, perspective view showing the second embodiment of the adapter coupled to the front end of a towed vehicle.

FIG. 9 is an isolated, perspective view showing a second embodiment of the adapter 10 coupled to the front end 26 of a towed vehicle 24. In many ways, the parts of the embodiment shown in FIG. 9 are analogous and similar to the parts of the embodiment shown in FIG. 8. For example, a bracket 18 is secured to horn-like tabs protruding from the front end 26 of a towed vehicle 24; further, an elevator control 12 is positioned atop an upper post 16, and is secured to the bracket 18. Moreover, like previously shown embodiments, a telescoping lower post 14 terminates in a ground-engaging means, such as a wheel 48, and couplers 38 extend outwardly from the bracket 18 and are configured to securely attach to a tow bar 20.

Experimentation and use have shown that the embodiment shown in FIG. 9 is better suited for paved or smooth surfaces, as the bumps and divots of an uneven surface or soft earth (such as grass, dirt, or gravel roads) may expose the wheel 48 to excessive damaging vibration, or may cause the wheel 48 to sink into soft ground, causing it to jam. In that regard, a damper 49 of resilient material may be positioned between the end of the lower post 14 and the wheel 48.

Although the present invention has been described and illustrated in detail, and a specific example has been given, these are for illustration and example only, and are not taken by way of limitation. The spirit and scope of the present invention are to be limited only by the terms of the appended claims.

I claim:

1. An adapter configured to tow a vehicle behind a motor home, the vehicle having horn-like tabs affixed to and protruding from a front face of the vehicle, and the motor home having fittings to receive a three-point towbar, the adapter comprising:
   a plate;
   respective receptacles attached to the plate, each configured to receive a respective tab that protrudes from the front face of the vehicle;
   a means for securing the adapter in a position wherein the respective tabs are positioned within the respective receptacles;
   an elevator configured to selectively position the adapter, thereby raising a front end of the towed vehicle.

2. The adapter as in claim 1, wherein the elevator comprises a jack.

3. The adapter as in claim 2, wherein the jack includes at least one of a scissors jack, a screw-jack, or an electric jack.

4. The adapter as in claim 2, further comprising
   an aperture in the plate;
   a post passing through the aperture;
   the elevator includes a pair of scissors jacks positioned on opposing sides of the post.

5. The adapter as in claim 1, further comprising an aperture in the plate; and,
   the elevator includes a jack having a post that passes through the aperture.

6. The adapter as in claim 5, further comprising:
   a web support extending generally upward from the plate, the web support having an upper plate with a bore positioned above the aperture; and,
   the elevator has a post that passes through each of the bore and the aperture.

7. The adapter as in claim 1, further comprising a switch configured to selectively activate the elevator.

8. The adapter as in claim 1, further comprising a remote control allowing one to selectively activate the elevator from a location distal the adapter.

9. The adapter as in claim 1, further comprising at least one of:
a wheel positioned adjacent a ground-engaging end of the elevator; or
a skid positioned adjacent a ground engaging end of the elevator.

10. A method for backing up a motor coach having a towed vehicle attached thereto, the towed vehicle having horn-like tabs affixed to and protruding from its front end, the method comprising the steps of:
providing an adapter comprising
a plate;
respective receptacles attached to the plate, each configured to receive a respective horn-like tab that protrudes from the front face of the vehicle;
a means for securing the adapter in a locked position, wherein the respective tabs are positioned within the respective receptacles;
positioning the adapter between the vehicle and the motor coach;
coupling the adapter to each of the vehicle and the motor coach;
attaching an elevator that is coupled to the adapter, the elevator configured to selectively position the adapter between
a first position, wherein the front wheels of the towed vehicle touch the ground, and
a second position wherein the front of the towed vehicle is elevated relative the ground;
and,
backing the motor home.

11. The method as in claim 10, wherein the elevator comprises a jack.

12. The method as in claim 11, wherein the jack is at least one of a scissors jack, a screw jack, or an electric jack.

13. The method as in claim 10, further comprising an aperture in the plate; and,
the means for elevating includes a jack having a post that passes through the aperture.

14. The method as in claim 13, further comprising:
a web support extending generally upward and orthogonal from the plate, the web support terminating in an upper plate having bore positioned above the aperture; and,
the elevator includes a post that passes through each of the bore and the aperture.

15. The method as in claim 14, wherein the elevator includes a pair of scissors jacks; and further including the step of positioning the scissors jack on opposite sides of the post.

16. The method as in claim 10, further comprising the step of configuring a switch to selectively activate the elevator.

17. The method as in claim 10, further comprising the step of controlling the elevator from a location distal and remote from the elevator.

18. The method as in claim 10, wherein the elevator is powered by the battery of the towed vehicle, and the method further comprises the steps of hooking up the elevator to the battery by means of electric cables passing through a grille of the towed vehicle.

19. An adapter configured to fit to standard attachments used in the towing of a vehicle behind a motor home, the standard attachments including a common three-point towbar having horn-like tabs that protrude from a front face of the vehicle, and the motor home having standard fittings to receive a three-point towbar, the adapter comprising:
a plate;
respective receptacles attached to the plate, each receptacle configured to receive a respective tab that protrudes from the front face of the vehicle;
a means for securing the adapter in a position wherein the respective tabs are positioned within the respective receptacles;
a web support extending generally upward from the plate, the web support having an upper plate with a bore positioned above the aperture;
an aperture in the plate;
a post passing through the aperture and the bore;
an elevator including a pair of scissors jacks configured to selectively position the adapter, thereby raising a front end of the towed vehicle, each scissors jack positioned on opposing sides of the post;
at least one of
a switch configured to selectively activate the elevator, or
a remote control allowing one to selectively activate the elevator from a location distal the adapter;
at least one of:
a wheel positioned adjacent a ground-engaging end of the adapter; or
a skid positioned adjacent a ground engaging end of the adapter.

* * * * *